(12) United States Patent
Morizono et al.

(10) Patent No.: US 9,087,285 B2
(45) Date of Patent: Jul. 21, 2015

(54) PRINTING APPARATUS AND PRINTING METHOD

(75) Inventors: Osamu Morizono, Kyoto (JP);
Tomoyasu Okushima, Kyoto (JP)

(73) Assignee: RICOH COMPANY, LTD., Tokyo (JP)

( * ) Notice: Subject to any disclaimer, the term of this patent is extended or adjusted under 35 U.S.C. 154(b) by 117 days.

(21) Appl. No.: 13/599,565

(22) Filed: Aug. 30, 2012

(65) Prior Publication Data

US 2013/0057915 A1   Mar. 7, 2013

(30) Foreign Application Priority Data

Sep. 1, 2011   (JP) ................................. 2011-190627

(51) Int. Cl.
| G06K 15/00 | (2006.01) |
| H04N 1/40 | (2006.01) |
| G06K 15/02 | (2006.01) |
| B41J 2/15 | (2006.01) |
| B41J 25/308 | (2006.01) |
| G06K 15/10 | (2006.01) |

(52) U.S. Cl.
CPC .......... *G06K 15/102* (2013.01); *G06K 15/1894* (2013.01)

(58) Field of Classification Search
USPC .................. 358/1.18; 347/13, 41, 247, 15, 19
See application file for complete search history.

(56) References Cited

U.S. PATENT DOCUMENTS

| 5,982,998 A * | 11/1999 | Takahashi et al. ............ 358/1.18 |
| 7,090,331 B2 * | 8/2006 | Karasawa et al. ................ 347/41 |
| 7,559,618 B2 * | 7/2009 | Oh et al. ........................... 347/15 |
| 8,147,024 B2 * | 4/2012 | Jeon .................................. 347/19 |
| 8,562,107 B2 * | 10/2013 | Tamai et al. ..................... 347/41 |
| 2005/0219291 A1 * | 10/2005 | Kusakari .......................... 347/13 |
| 2006/0143698 A1 * | 6/2006 | Ohara .............................. 726/10 |
| 2007/0035774 A1 * | 2/2007 | Kubo ............................ 358/3.28 |
| 2009/0109274 A1 * | 4/2009 | Hori et al. ...................... 347/247 |
| 2009/0208065 A1 * | 8/2009 | Miura et al. .................... 382/112 |
| 2011/0227978 A1 * | 9/2011 | Matsumoto .................... 347/12 |
| 2012/0267468 A1 * | 10/2012 | Shiode ....................... 242/419.8 |

FOREIGN PATENT DOCUMENTS

JP         2010-288014 A    12/2010

* cited by examiner

*Primary Examiner* — Akwasi M Sarpong
(74) *Attorney, Agent, or Firm* — McDermott Will & Emery LLP (57) ABSTRACT

A printing apparatus for performing printing under control of a head controller which receives image data, and which is connected to a print head for printing. The head controller includes an image data shaping unit for shaping the image data into print data corresponding to the print head, a sequence information generating unit for generating sequence information, based on the print data, showing operation at a time of printing by the print head, a data guarantee information adding unit for adding data guarantee information to the print data and the sequence information, for error detection based on the print data and the sequence information, a readout unit for reading print information including the print data, the sequence information, and the data guarantee information, and an information inspecting unit for inspecting propriety of the print information based on the data guarantee information and the sequence information read by the readout unit.

17 Claims, 8 Drawing Sheets

→ ADDRESS X

ADDRESS Y ↓

| | HEAD 1 | | HEAD 2 | | HEAD 3 | |
|---|---|---|---|---|---|---|
| | 1ST NOZZLE ROW | 2ND NOZZLE ROW | 1ST NOZZLE ROW | 2ND NOZZLE ROW | 1ST NOZZLE ROW | 2ND NOZZLE ROW |
| BUFFER 1 | H1-1_L1 | H1-2_L1 | H2-1_L1 | H2-2_L1 | H3-1_L1 | H3-2_L1 |
| BUFFER 2 | H1-1_L2 | H1-2_L2 | H2-1_L2 | H2-2_L2 | H3-1_L2 | H3-2_L2 |
| BUFFER 3 | H1-1_L3 | H1-2_L3 | H2-1_L3 | H2-2_L3 | H3-1_L3 | H3-2_L3 |
| BUFFER 4 | H1-1_L4 | H1-2_L4 | H2-1_L4 | H2-2_L4 | H3-1_L4 | H3-2_L4 |

Fig. 10

→ ADDRESS X

ADDRESS Y ↓

| | HEAD 1 | | HEAD 2 | | HEAD 3 | |
|---|---|---|---|---|---|---|
| | 1ST NOZZLE ROW | 2ND NOZZLE ROW | 1ST NOZZLE ROW | 2ND NOZZLE ROW | 1ST NOZZLE ROW | 2ND NOZZLE ROW |
| BUFFER 1 | H1-1_L1 | | H2-1_L1 | | H3-1_L1 | |
| BUFFER 2 | H1-1_L2 | | H2-1_L2 | | H3-1_L2 | |
| BUFFER 3 | H1-1_L3 | | H2-1_L3 | | H3-1_L3 | |
| BUFFER 4 | H1-1_L4 | H1-2_L1 | H2-1_L4 | | H3-1_L4 | |
| | | H1-2_L2 | | H2-2_L1 | | H3-2_L1 |
| | | H1-2_L3 | | H2-2_L2 | | H3-2_L2 |

Fig.11

PRINTING APPARATUS AND PRINTING METHOD

BACKGROUND OF THE INVENTION (1) Field of the Invention

This invention relates to a printing apparatus and a printing method for transmitting print data for printing images, characters, and so on to a print head to print the images and others based on the print data.

(2) Description of the Related Art

Conventionally, this type of apparatus includes a printing apparatus having a transmitter for transmitting image data along with inspection information based thereon, a receiver for receiving the image data from the transmitter through a transmission channel, and an image corrector for performing printing based on the image data received by the receiver. See Japanese Unexamined Patent Publication No. 2010-288014 (FIGS. 1 and 2), for example.

The receiver detects errors in the received image data based on the inspection information. When the receiver detects an error, the image corrector corrects the error, and performs printing based on the corrected image data.

However, the conventional example with such construction has the following problem.

The conventional apparatus can detect and correct errors when image data is corrupted under the influence of noise or the like in the transmission channel. However, it is impossible to detect abnormalities in an operating sequence showing operation of each component at the time of printing by the printing apparatus. Consequently, the printing based on the image data is continued even if there is an abnormality in the operating sequence of the printing apparatus, which could result in a printing failure.

SUMMARY OF THE INVENTION

This invention has been made having regard to the state of the art noted above, and its object is to provide a printing apparatus and a printing method, which can detect an abnormality in an operating sequence at the time of printing, thereby to prevent a printing failure due to the abnormality in the operating sequence.

The above object is fulfilled, according to this invention, by a printing apparatus for performing printing under control of a head controller which receives image data from a print image generator, and which is interposed between a print head for printing and the print image generator, the head controller comprising an image data shaping unit for shaping the image data into print data corresponding to the print head; a sequence information generating unit for generating sequence information, based on the print data, showing operation at a time of printing by the print head; a data guarantee information adding unit for adding data guarantee information to the print data and the sequence information, for error detection based on the print data and the sequence information; a readout unit for reading print information including the print data, the sequence information, and the data guarantee information; and an information inspecting unit for inspecting propriety of the print information based on the data guarantee information and the sequence information read by the readout unit.

According to this invention, based on the print data shaped from the image data by the image data shaping unit, the sequence information generating unit generates the sequence information showing operation at the time of printing. The data guarantee information adding unit obtains the data guarantee information from, and adds it to, the print data and sequence information. Based on the data guarantee information and sequence information read by the readout unit, the information inspecting unit inspects propriety of the print information. Since any abnormality occurring in the sequence of operation at the time of printing can be detected, a printing failure due to the abnormality of the operating sequence can be prevented without continuing the printing based on the print data.

In this invention, the print head may include a plurality of inkjet type heads, each having a plurality of nozzles arranged in a primary scanning direction perpendicular to a secondary scanning direction corresponding to a direction of movement relative to printing paper, the plurality of heads being juxtaposed in the primary scanning direction; and the sequence information may include sheet IDs indicating pages of the printing paper, line IDs indicating line numbers of the print data in the secondary scanning direction, head IDs indicating numbers of the plurality of heads, nozzle IDs indicating nozzle row numbers in the direction of arrangement of the nozzles on the print head.

The print head includes a plurality of inkjet type heads. Each head has a plurality of nozzles arranged in a primary scanning direction perpendicular to a secondary scanning direction corresponding to a direction of movement relative to printing paper. The plurality of heads are juxtaposed in the primary scanning direction. Where the print head has such a construction, the sheet ID is incremented with each page of printing paper, and the line ID is incremented with progress in the secondary scanning direction of printing based on the print data. Therefore, presence or absence of an abnormality can be determined only by inspecting increments occurring with progress of printing. The head ID and nozzle ID are variable with progress of printing based on the print data. Therefore, presence or absence of an abnormality can be determined from whether there is any discrepancy between head ID and nozzle ID which are allotted beforehand based on shaping data. As a result, whether the operating sequence has abnormalities can be inspected based on the sequence information including these IDs.

In this invention, the information inspecting unit may be arranged to transmit the print data to the print head only when the data guarantee information is errorless and the sequence information is errorless, and when the sequence information has an error, report the error.

The information inspecting unit outputs the print data to the print head to allow printing only when the data guarantee information and the sequence information are errorless. On the other hand, when the sequence information has an error, the inspecting unit reports the error. Thus, the operator can take necessary measures such as stopping the apparatus.

In another aspect of the invention, there is provided a printing method for performing printing under control of a head controller which receives image data from a print image generator, and which is interposed between a print head for printing and the print image generator, the method comprising the steps of shaping the image data into print data corresponding to the print head; generating sequence information, based on the print data, showing operation at a time of printing by the print head; adding data guarantee information to the print data and the sequence information, for error detection based on the print data and the sequence information; reading print information including the print data, the sequence information, and the data guarantee information; and inspecting propriety of the print information based on the data guarantee information and the sequence information.

According to this invention, the shaping step shapes the image data into print data corresponding to the print head, and based on the print data the sequence information generating step generates the sequence information showing operation at the time of printing. The data guarantee information adding step obtains the data guarantee information from, and adds it to, the print data and sequence information. Based on the data guarantee information and sequence information read by the readout unit, the information inspecting step inspects propriety of the print information. Since any abnormality occurring in the sequence of operation at the time of printing can be detected, a printing failure due to the abnormality in operation can be prevented without continuing printing based on the print data.

In this invention, after the step of inspecting the information, the print data may be transmitted to the print head only when the data guarantee information is errorless and the sequence information is errorless, and when the sequence information has an error, the error may be reported.

After the step of inspecting the information, the print data is outputted to the print head only when the data guarantee information and the sequence information are errorless. On the other hand, when the sequence information has an error, the error is reported. Thus, the operator can become away of a problem in the operating sequence of the apparatus, and take necessary measures such as stopping the apparatus.

BRIEF DESCRIPTION OF THE DRAWINGS

For the purpose of illustrating the invention, there are shown in the drawings several forms which are presently preferred, it being understood, however, that the invention is not limited to the precise arrangement and instrumentalities shown.

DESCRIPTION OF THE PREFERRED EMBODIMENTS

One embodiment of this invention will be described hereinafter with reference to the drawings.

Figure 1:
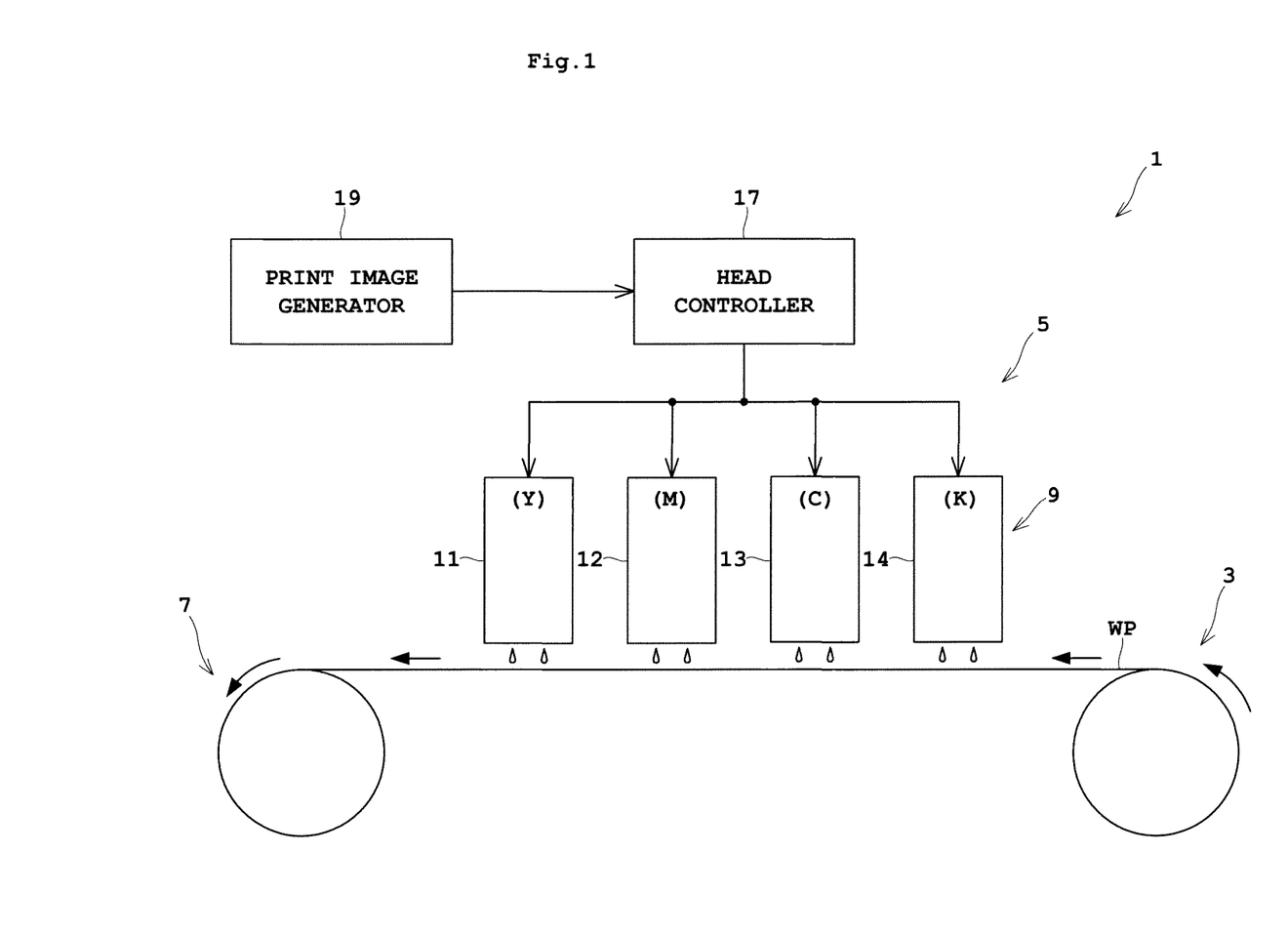
FIG. 1 is a schematic view showing an outline of a printing apparatus according to this invention.
Figure 2:
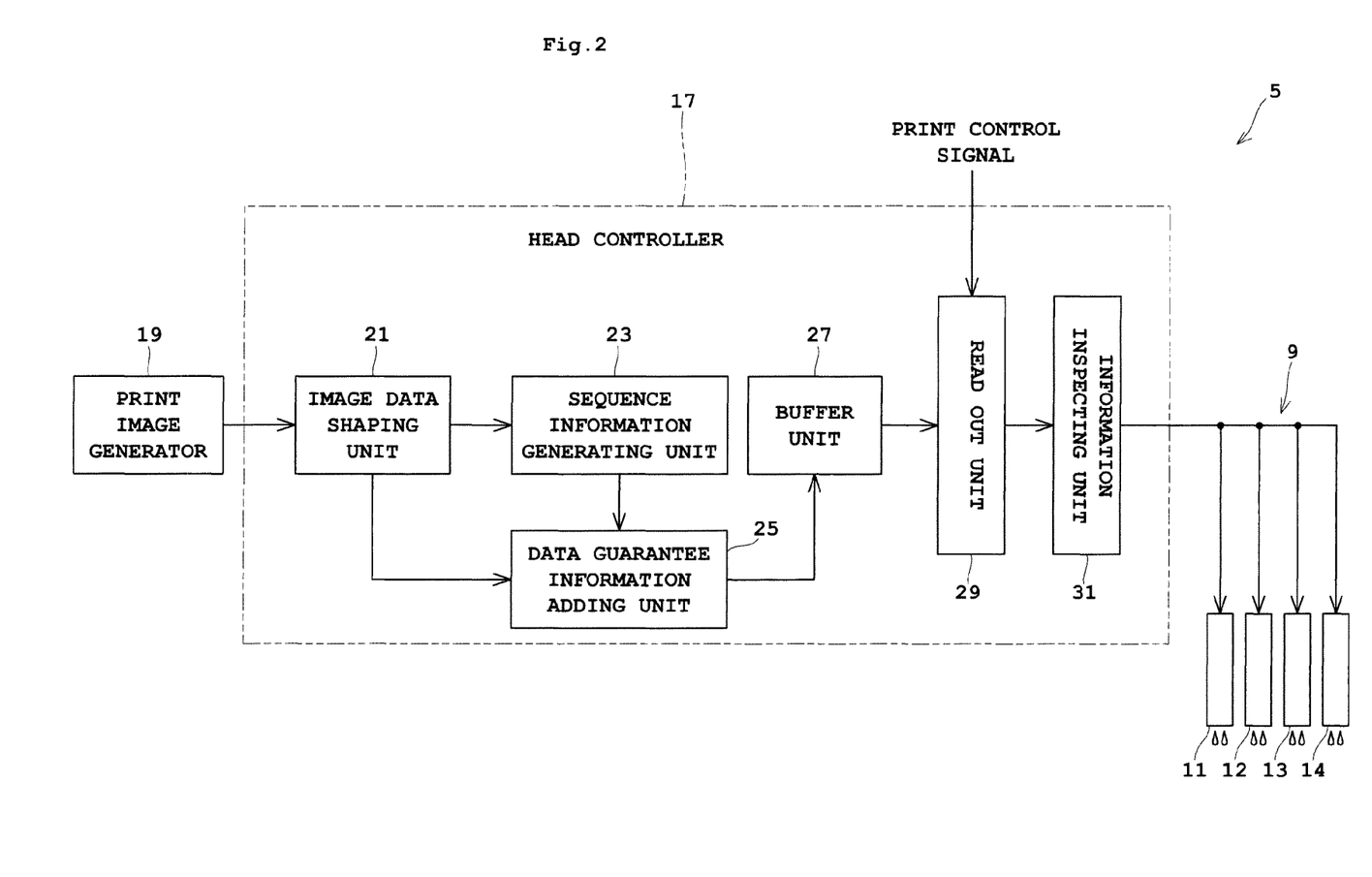
FIG. 2 is a block diagram showing a principal portion of a printing station.

FIG. 1 is a schematic view showing an outline of a printing apparatus according to this invention. FIG. 2 is a block diagram showing a principal portion of a printing station.

A printing apparatus 1 includes a paper feeder 3, a printing station 5, and a paper discharger 7. The paper feeder 3 feeds web paper WP (printing paper) stored in a roll form, for example. The printing station 5 prints images, characters, and so on the web paper WP fed thereto. The paper discharger 7 winds up printed web paper WP in a roll form. In the following description, the direction in which the printing station 5 and the web paper WP move relative to each other is called the secondary scanning direction, and the direction perpendicular to the plane of FIG. 1 the primary scanning direction.

This embodiment will be described on an assumption that the printing station 5 has an inkjet type construction. This printing station 5 has a print unit 9 disposed adjacent the upper surface of web paper WP. The print unit 9 includes a print head 11 for yellow (Y), a print head 12 for magenta (M), a print head 13 for cyan (C), and a print head 14 for black (K) arranged in the stated order from a downstream side (adjacent the paper discharger 7) of the web paper WP, for example.

A head controller 17 is connected to each of the print heads 11-14. A print image generator 19 is connected to the head controller 17. The print image generator 19 is formed of a computer, for example, which generates image data to be printed, and outputs the image data to the head controller 17. The head controller 17, as described in detail hereinafter, shapes the image data inputted from the print image generator 19, and prepares print information by generating information for error checking and other information. The print information prepared is outputted to the print unit 9 which carries out printing on the web paper WP according to the print information.

As shown in FIG. 2, the head controller 17 includes an image data shaping unit 21, a sequence information generating unit 23, a data guarantee information adding unit 25, a buffer unit 27, a readout unit 29, and an information inspecting unit 31.

Figure 3:
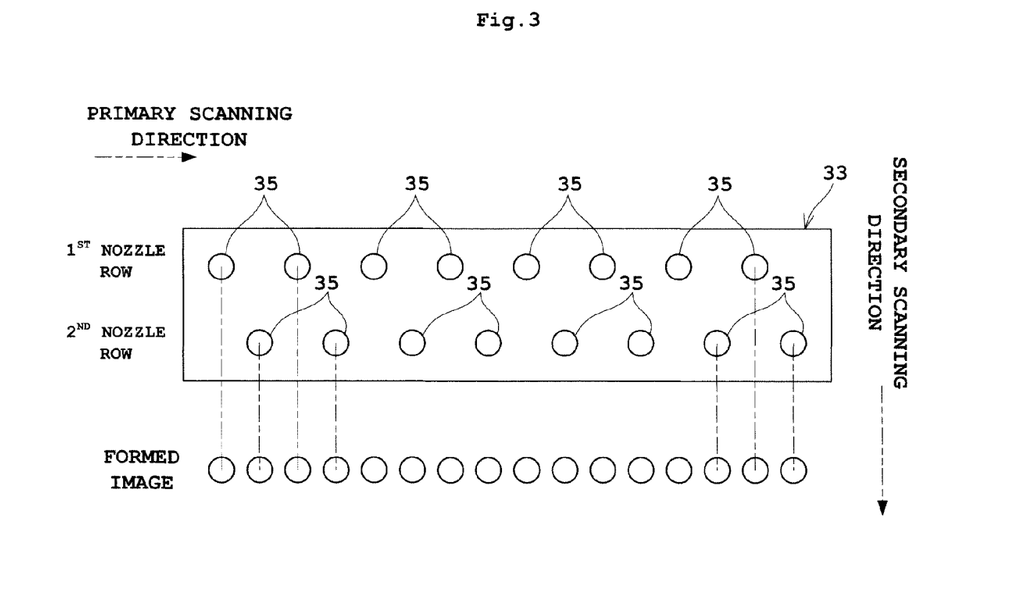
FIG. 3 is a bottom plan view showing a construction of nozzles.
Figure 4:
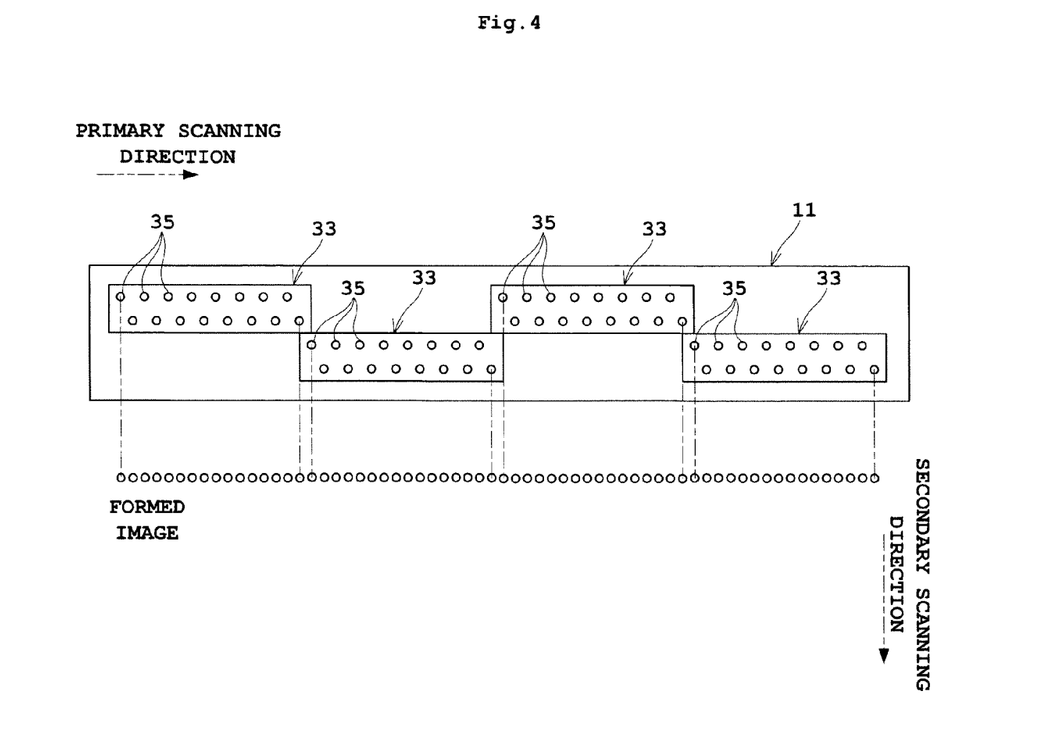
FIG. 4 is a bottom plan view showing a construction of a print head.
Figure 5:
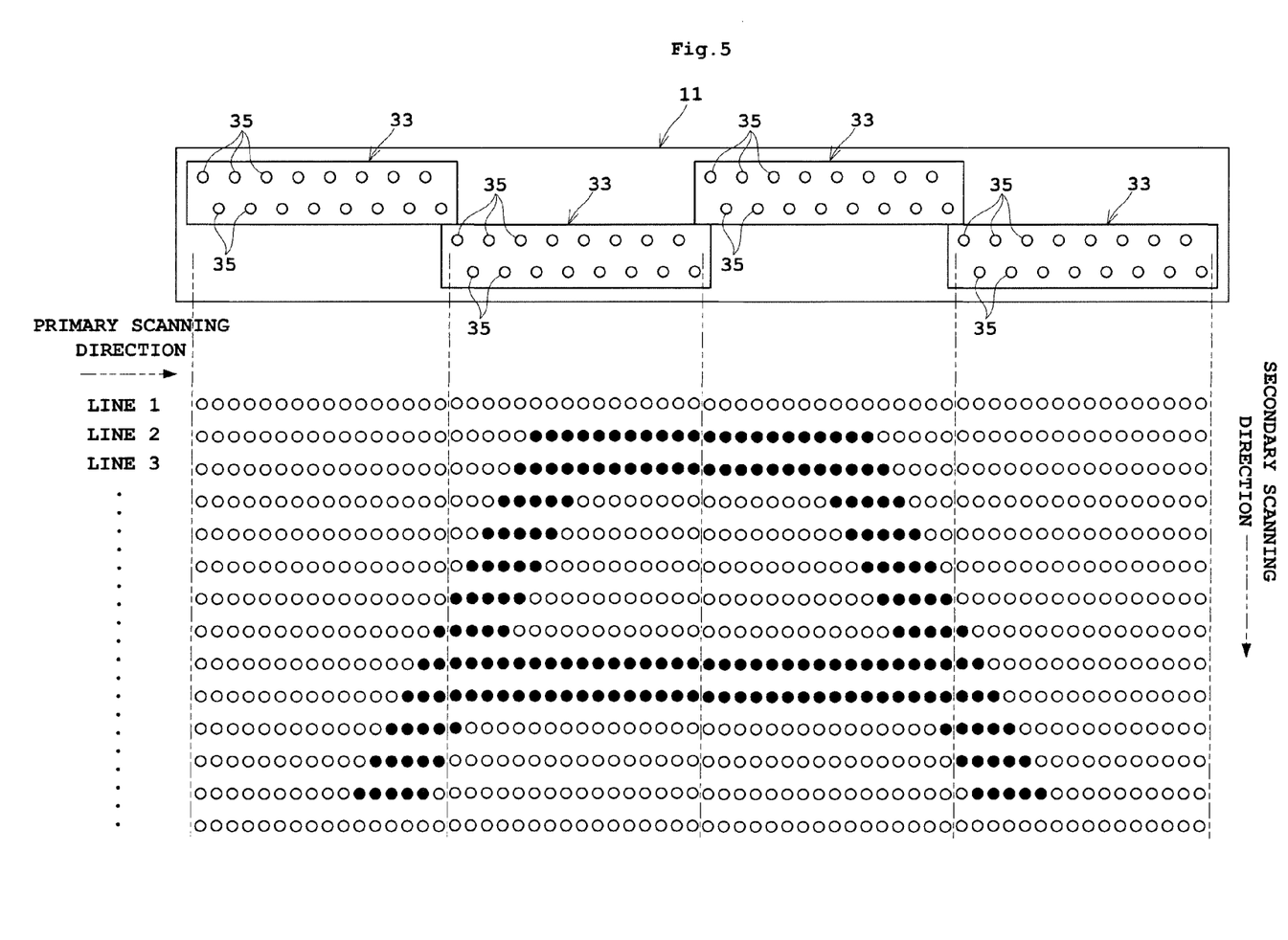
FIG. 5 is a schematic view showing a relationship between print nozzles and formed image.

Before describing details of each of the above components, the print heads 11-14 will be described with reference to FIGS. 3-5. FIG. 3 is a bottom plan view showing a construction of nozzles. FIG. 4 is a bottom plan view showing a construction of a print head. FIG. 5 is a schematic view showing a relationship between print nozzles and formed image. The print heads 11-14 are different from one another only in the color of ink droplets discharged, and are all the same in construction itself. Thus, the following description will be made taking the print head 11 for example.

The print head 11 includes heads 33. Each of these heads 33 has a plurality of nozzles 35 for discharging ink droplets. The nozzles 35 are arranged in two rows, for example, consisting of a first row in which the nozzles 35 are arranged linearly at predetermined intervals in the primary scanning direction, and a second row in which the nozzles 35 are also arranged at the predetermined intervals. Each nozzle 35 in the second row is located between two adjacent nozzles 35 in the first row. The intervals between the nozzles 35 in the first and second rows are 300 dpi, for example. In this case, the timing of ink droplet application from one nozzle row is shifted from that of the other, to discharge ink droplets on the same line on the web paper WP. Then, as shown in the formed image, the ink droplets can be applied at half the intervals between the nozzles 35 in the first row and between the nozzles 36 in the second row. That is, the resolution of the formed image can be made 600 dpi which is twice that of each nozzle row in this case.

Further, the print head 11 in this embodiment is constructed as shown in FIG. 4. That is, the print head 11 has the above heads 33 juxtaposed to have ends thereof overlapping each other in the primary scanning direction. With such construction, even if one head 33 is smaller than a printing width of the web paper WP, the formed image can have a predetermined print width on the web paper WP.

Image formation by the print head 11 having the above construction will particularly be described with reference to FIG. 5. FIG. 5 is a schematic view showing a relationship between print nozzles and formed image.

The print head 11 has a plurality of heads 33 juxtaposed as described above. When, for example, "A" of the alphabet is received as image data, each nozzle 35 of each head 33 of the print head 11 takes a positional relationship with "A" of the alphabet as shown in FIG. 5. The printed image "A" forms on the web paper WP a plurality of lines in the order of line 1, line 2, line 3, and so on in the secondary scanning direction.

Figure 6:
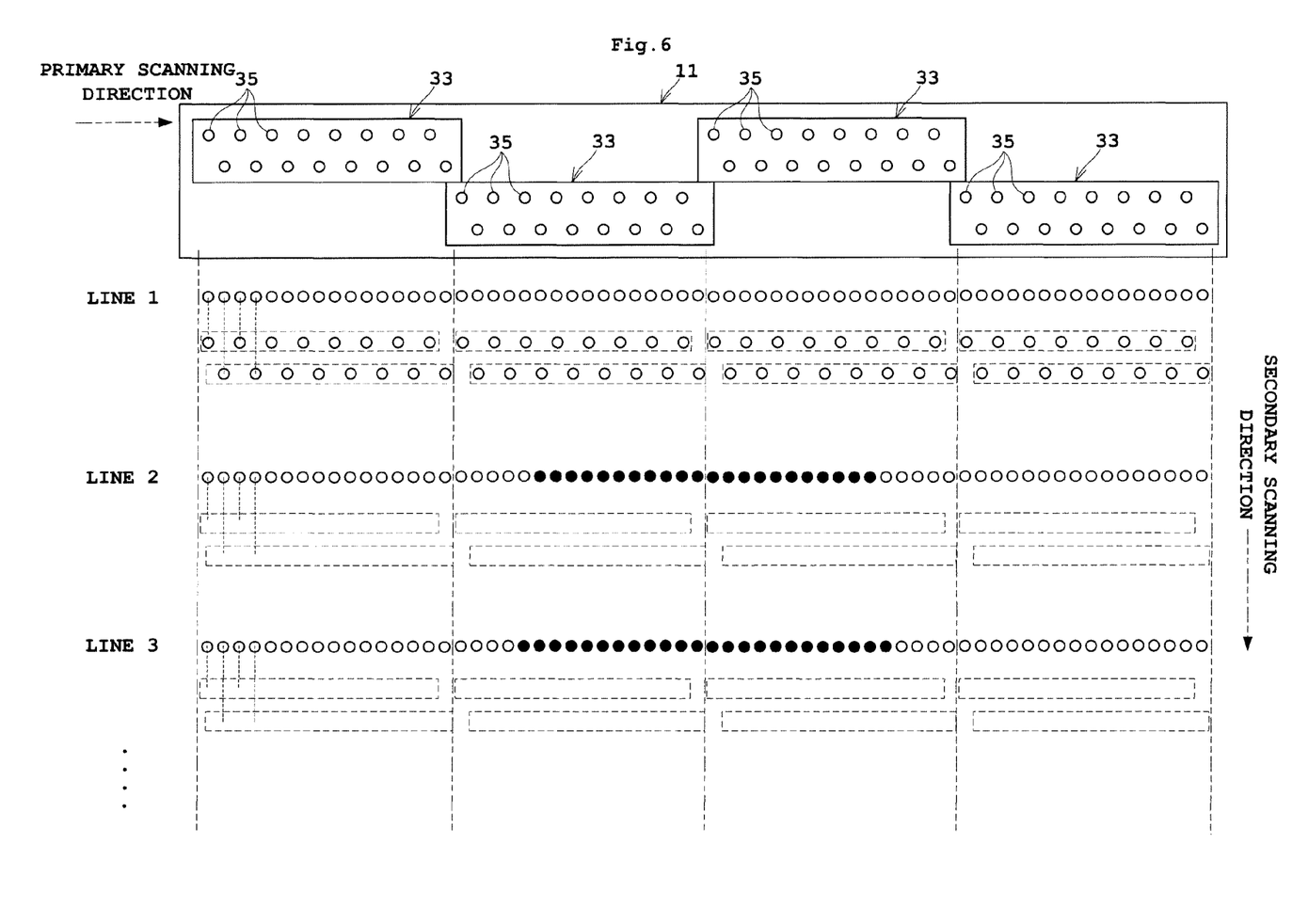
FIG. 6 is a schematic view showing a relationship between print nozzles and print data.

The print data will now be described with reference to FIG. 6. FIG. 6 is a schematic view showing a relationship between print nozzles and print data.

When the print nozzles and the printed image are in the positional relationship shown in FIG. 5, in order to form the printed image, the image data shaping unit 21 shapes the received image data into print data as follows, for example.

First, the image data is put to a separating and dividing process as shown in FIG. 6. In the separating and dividing process, for example, the image data is shaped to cause the first nozzle row of the head 33 located at the extreme left of the print head 11 to apply ink droplets to line 1 of the printed image "A", and the second nozzle row of the same head 33 to apply ink droplets to line 1 of the printed image "A". The image data is shaped similarly for each nozzle row of each head 33. Similarly, the image data is shaped into print data for causing each nozzle row of each head 33 to apply ink droplets to a corresponding one of the lines of the printed image "A".

Next, the sequence information generating unit 23 generates sequence information which specifies operation of each component from the print data of the image data corresponding to the printed image "A". The sequence information includes the following items, for example:

Sheet IDs: Indicate pages of the web paper WP;

Line IDs: Indicate line numbers of the print data in the secondary scanning direction;

Head IDs: Indicate numbers of the heads 33 constituting the print heads 11-14;

Nozzle IDs: Indicate nozzle row numbers of each head 33; and

Weight IDs: Indicate non-print areas of the web paper WP.

Figure 7:
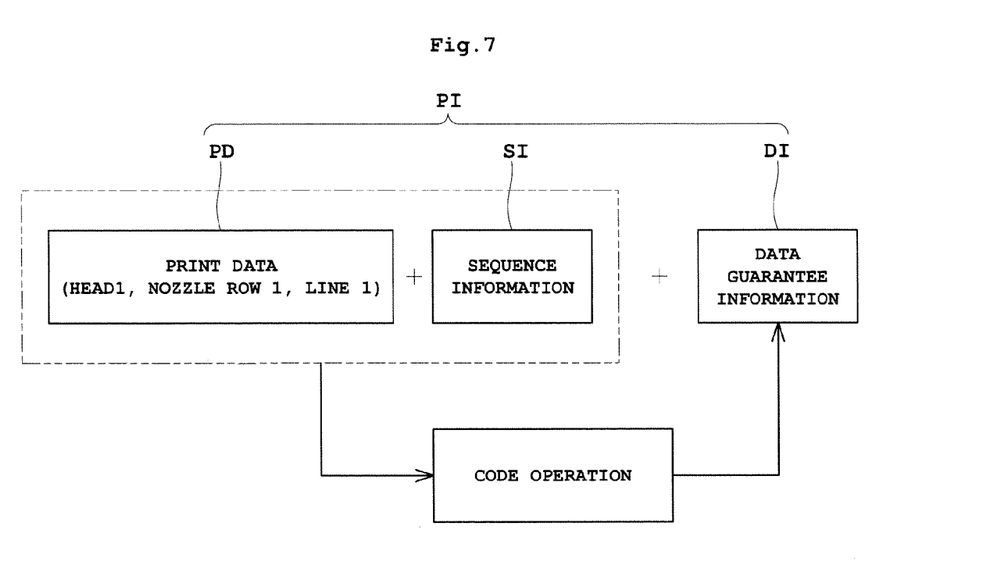
FIG. 7 is an explanatory view of calculation of data guarantee information.

After shaping the image data into the print data for each nozzle row of the heads 33 and generating the sequence information as described above, the data guarantee information adding unit 25 adds data guarantee information for each nozzle row based on the print data and sequence information. FIG. 7 shows this schematically. FIG. 7 is an explanatory view of calculation of the data guarantee information. While data guarantee information DI is calculated by code operation, various types of operation can be applied as the code operation. The code operation may use a hamming code, for example. This hamming code is one of the error-correcting codes which can detect and correct errors in data. The hamming code can correct 1-bit errors and detect errors of 2 or more bits. Print data PD, sequence information SI, and data guarantee information DI obtained in this way serve as print information PI for each nozzle row of each head 33.

Apart from the above hamming code, parity, check-sum or cyclic redundancy check may be used for the code operation. However, a complicated code operation should preferably be avoided since, in single pass printing (also called one-pass printing), as in this embodiment, in which all colors are applied at once when the print heads 11-14 move relative to the web paper WP, it is necessary to send the print information to the printing unit 9 at high speed.

Figure 8:
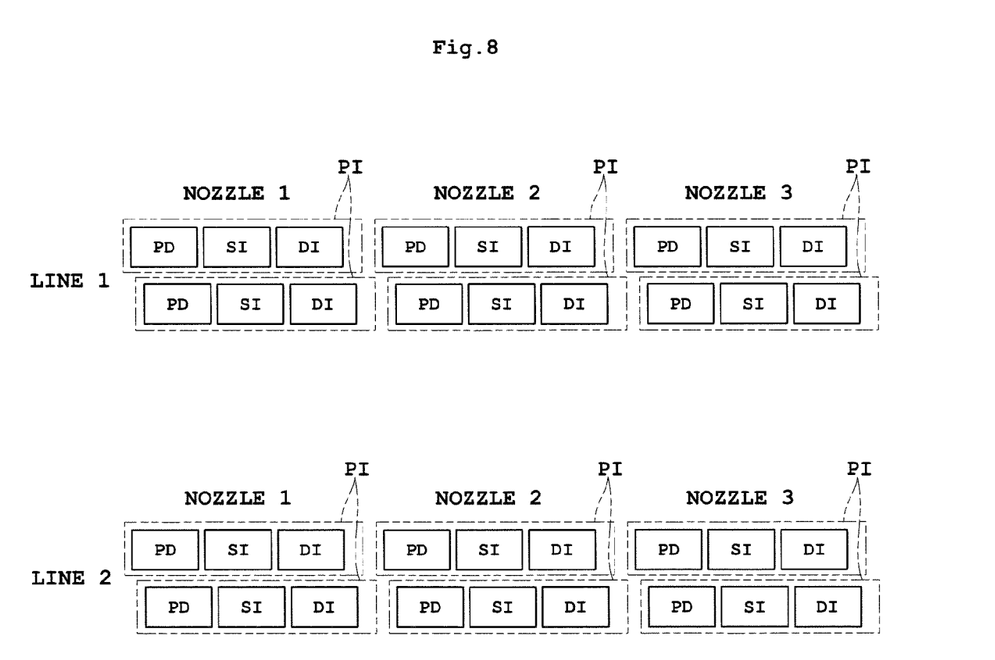
FIG. 8 is a schematic view showing print information.

The above print information has details as shown in FIG. 8. FIG. 8 is a schematic view showing the print information.

Print information PI is generated for each head 33, for each nozzle row of the head 33 and for each line on the web paper WP.

Figure 9:
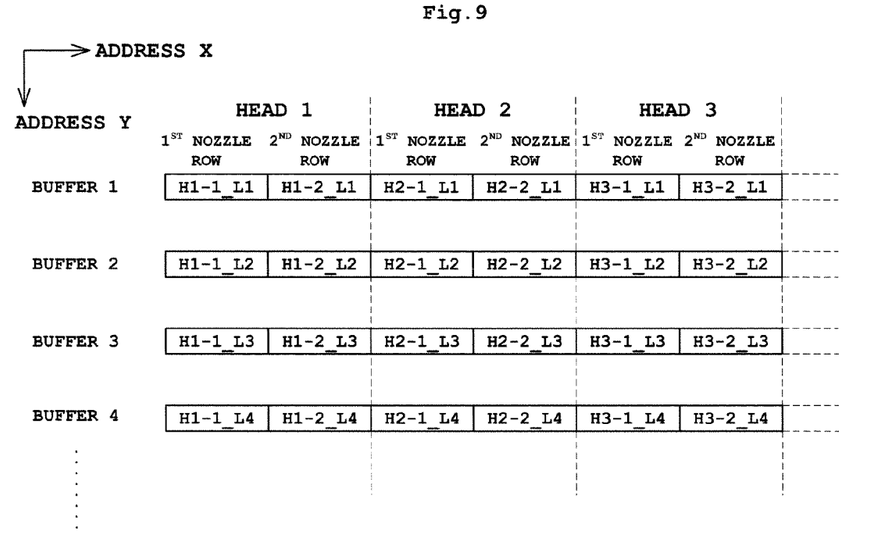
FIG. 9 is a schematic view showing writing by bank control to a buffer unit.
Figure 10:
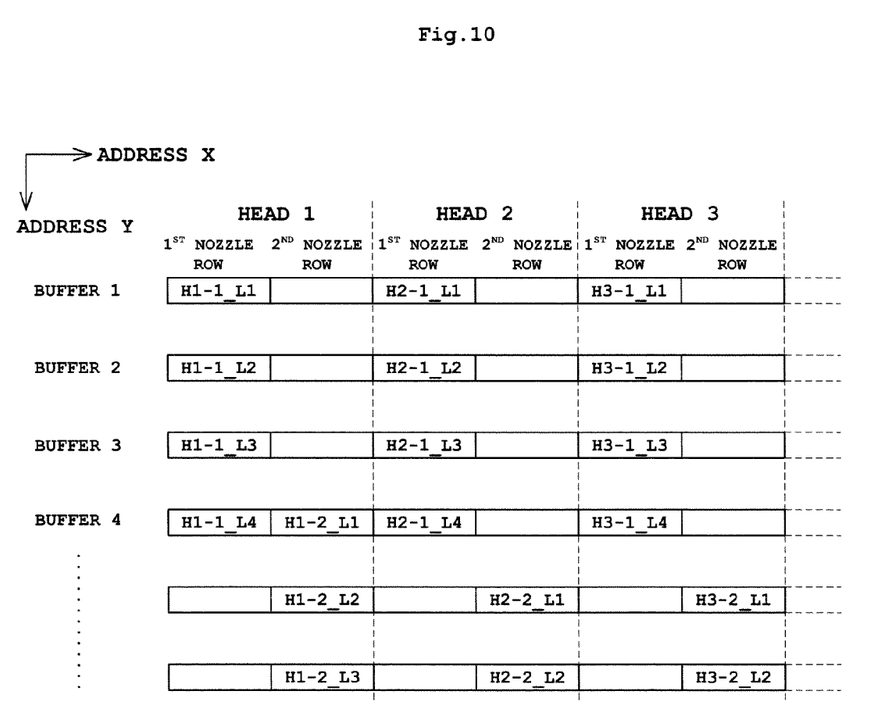
FIG. 10 is a schematic view showing writing by roll control to the buffer unit.

The print information PI generated for each nozzle row of each head 33 is successively read by the readout unit 29 through the buffer unit 27. There are "bank control" and "roll control" as modes of storage of the print information PI in the buffer unit 27. The modes of storage of the print information PI in the buffer unit 27 will be described with reference to FIGS. 9 and 10. FIG. 9 is a schematic view showing writing by bank control to the buffer unit 27. FIG. 10 is a schematic view showing writing by roll control to the buffer unit 27.

The "bank control" mode shown in FIG. 9 sets up a virtual arrangement of primary scanning and secondary scanning in two dimensions to control writing to the buffer unit 27. The signs in FIG. 9 are H1 (first head 33), H2 (second head 33), H3 (third head 33), and so on, in order from the extreme left head 33 of the print head 11. H1-1 indicates the first nozzle row of the first head 33, and H1-2 the second nozzle row of the first head 33. H1-1_L1 indicates ink droplet application to line 1 from the first nozzle row of the first head 33, and H1-1_L2 ink droplet application to line 2 from the same nozzle row.

Since droplet application timing is different for each nozzle row in this bank control system, it is necessary to carry out a delay control of readout from the buffer unit 27 to the readout unit 29.

The "roll control" mode shown in FIG. 10 takes into consideration a delay between a plurality of, e.g. two, nozzle rows, and controls writing to the buffer unit 27 by shifting write-in positions of the print information. The signs in FIG. 10 have the same meanings as in FIG. 9.

Since this roll control mode takes the ink droplet application timing of each nozzle row into consideration, the print information may be read simply in order by the readout unit 29.

The print information PI written to the buffer unit 27 as described above is read by the readout unit 29 in response to a print control signal, and is given to the print unit 9 after inspection by the information inspecting unit 31. At this time, error detection of the print information PI is carried out based on the data guarantee information DI, and error detection of the sequence based on the sequence information SI. Only when both are found errorless, the print data PD is given to the print unit 9. It is already known, at the time of shaping from the image data to the print data PD, to which line on which page of the web paper WP ink is to be applied from which nozzle of which row in which head, as well as timing of non-print areas to be left on the web paper WP. Such information is stored beforehand as printing sequence information. The sequence information SI of the print information PD is compared with the printing sequence information to determine its propriety, i.e. whether any error is detected, by the information inspecting unit 31 successively with the progress of printing.

Figure 11:
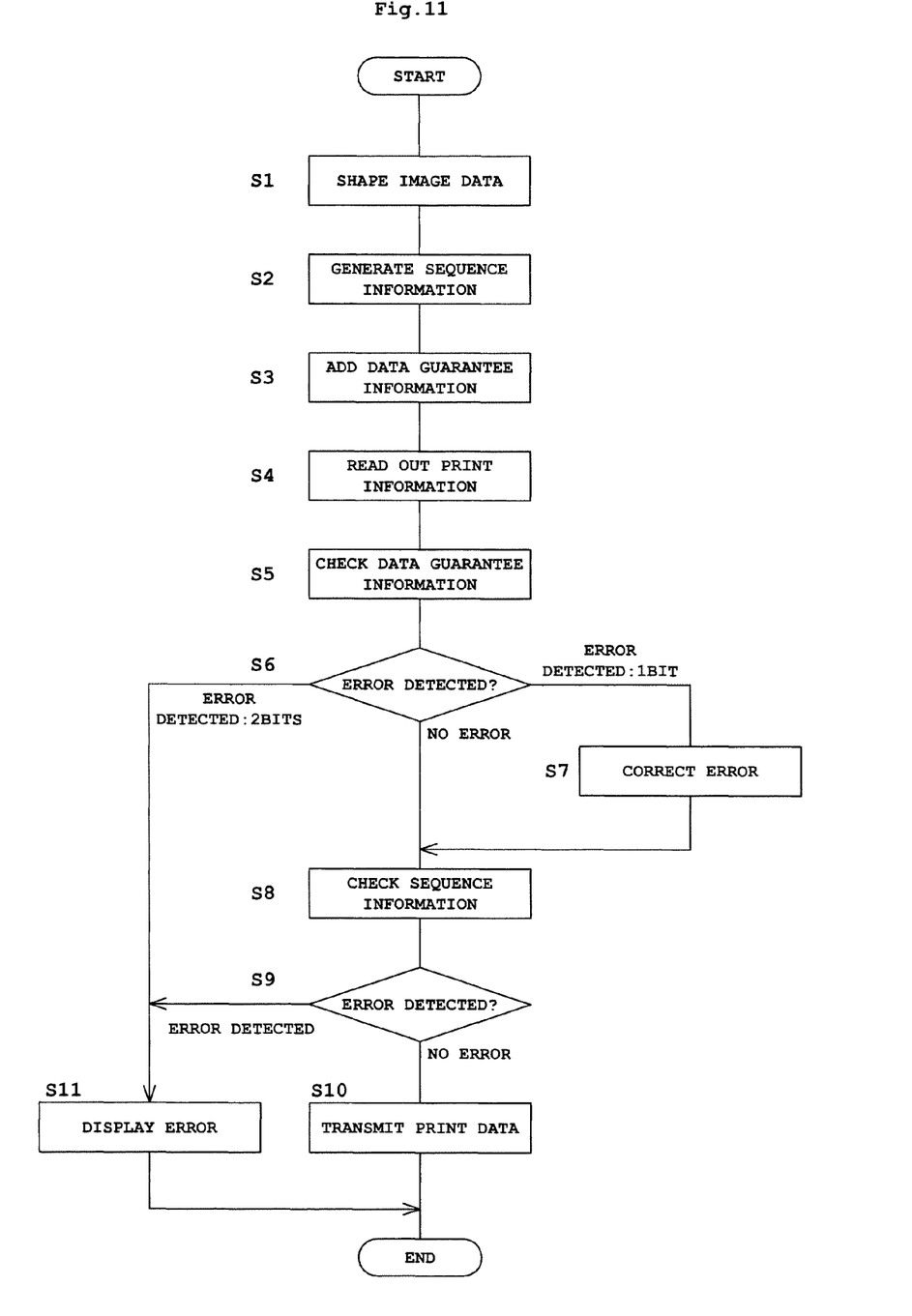
FIG. 11 is a flow chart showing operation of the printing apparatus.

Next, operation of the printing apparatus having the above construction will be described with reference to FIG. 11. FIG. 11 is a flow chart showing operation of the printing apparatus.

Step S1

The head controller 17 receives image data from the print image generator 19. And the image data shaping unit 21 shapes the image data into print data PD for each nozzle row of each head 33 of the print heads 11-14.

Step S2

The sequence information generating unit 23 generates sequence information SI based on the print data PD received from the image data shaping unit 21.

Step S3

The data guarantee information adding unit 25 carries out the code operation based on the print data PD and sequence information SI to generate data guarantee information DI. And the data guarantee information DI is added to the print data PD and sequence information SI for each nozzle row, to generate print information PI for each nozzle row.

Step S4

The readout unit 29 reads the print information PI for each nozzle row of each head 33 of the print heads 11-14 through the buffer unit 27.

Steps S5 and S6

The information inspecting unit 31 determines propriety of the data guarantee information DI for each print information PI read, and bifurcates the operation in response to results of the determination. When, for example, 1-bit hamming code is employed for error correction and an error of 2 or more bits is detected, the operation proceeds to step S11. When the error detected is 1 bit, the operation proceeds to step S7. After correcting the 1-bit error, the operation proceeds to step S8.

Steps S8 and S9

When no error is detected in the data guarantee information DI, the information inspecting unit 31 determines propriety of the sequence information SI next, and bifurcates the operation in response to results of the determination. Specifically, the sequence information SI is checked as follows.

Since sheet ID is incremented with each page of the web paper WP, a checking is made whether the sheet ID increases with progress of printing in the secondary scanning direction. No change, a decrease, or an increase by two or more occurring with the sheet ID indicates an abnormality in the operating sequence due to a constitutional problem. Line ID is incremented with progress of printing in the secondary scanning direction. Therefore, a checking is made whether the line ID increases with progress of printing in the secondary scanning direction. Regarding head ID and nozzle ID, which nozzle 35 of which head 33 of which one of the print heads 11-14 applies ink droplets at which time is already known from the printing sequence information. Therefore, as the printing advances, whether a location to which the printing unit 9 is applying ink droplets at present is appropriate in the operating sequence can be determined from comparison with the printing sequence information. Since weight ID indicates a non-print area of the web paper WP, when printing is made to that area based on the printing sequence information, it can be determined that a problem has arisen with the operating sequence.

Step S10

Only when the data guarantee information DI and the sequence information SI are free from abnormality, the print data PD is outputted to the printing unit 9 to carry out printing on the web paper WP.

Step S11

An error display is given when the sequence information SI has an error, or when the data guarantee information DI has an error of 2 or more bits. Specifically, an abnormality is reported by presenting the occurrence of an error on a display unit, not shown, of the printing apparatus, and/or giving an alarm sound. Consequently, the operator of the printing apparatus becomes aware of a data corruption occurring in the print information PI due to noise or the like, or a problem with the operating sequence. Therefore, the operator can take necessary measures such as stopping the printing apparatus, to prevent a printing failure.

Step S1 described above corresponds to the "shaping step" in this invention. Step S2 corresponds to the "sequence information generating step" in this invention. Step S3 corresponds to the "data guarantee information adding step" in this invention. Step S4 corresponds to the "readout step" in this invention. Steps S6 and S9 correspond to the "information inspecting step" in this invention. Step S10 corresponds to the "print data transmitting step" in this invention. Step S11 corresponds to the "error reporting step" in this invention.

Thus, according to the apparatus in this embodiment, based on the print data PD shaped from the image data by the image data shaping unit 21, the sequence information generating unit 23 generates the sequence information SI showing operation at the time of printing. The data guarantee information adding unit 25 obtains the data guarantee information DI from, and adds it to, the print data PD and sequence information SI. Based on the data guarantee information DI and sequence information SI read by the readout unit 29, the information inspecting unit 31 inspects propriety of the print information PI. Since any abnormality occurring in the sequence of operation at the time of printing can be detected, a printing failure due to the abnormality of the operating sequence can be prevented without continuing the printing based on the print data PD.

This invention is not limited to the foregoing embodiment, but may be modified as follows:

(1) In the foregoing embodiment, the sequence information includes sheet IDs, line IDs, head IDs, nozzle row IDs, and weight IDs. However, such information is not limitative, but may be replaced with other appropriate information as long as the latter enables checking of propriety of the operating sequence.

(2) In the foregoing embodiment, the inkjet type printing apparatus has been described by way of example. This invention is not limited to such printing mode, but is applicable also printing apparatus of other modes.

(3) The foregoing embodiment exemplifies a printing apparatus which employs what is called single-pass printing. This invention is applicable also to a printing apparatus employing multi-pass printing.

(4) In the foregoing embodiment, when an error of 2 or more bits is detected in step S6, the operation moves to step S11 for error display. However, a retransmission request may be made instead. Then, when influenced by noise occurring intermittently, generation of errors can be avoided.

(5) In the foregoing embodiment, redundant information may also be provided to employ a correcting circuit having increased correcting capability.

(6) In the foregoing embodiment, web paper WP is used as printing paper. This invention is not limited to such printing paper, but may use cut-sheet printing paper.

This invention may be embodied in other specific forms without departing from the spirit or essential attributes thereof and, accordingly, reference should be made to the appended claims, rather than to the foregoing specification, as indicating the scope of the invention.

What is claimed is:

1. A printing apparatus for performing printing under control of a head controller which receives image data from a print image generator, and which is interposed between the print image generator and a printing station with a print head having a plurality of inkjet type heads juxtaposed in a primary scanning direction perpendicular to a secondary scanning direction corresponding to a direction of movement relative to printing paper for printing, each head having a plurality of nozzles arranged in the primary scanning direction, the head controller comprising:

an image data shaping unit for shaping the image data into print data corresponding to each of the nozzles arranged on the plurality of heads juxtaposed on the print head;

a sequence information generating unit for generating sequence information based on the print data, the sequence information including sheet IDs indicating pages of the printing paper, line IDs indicating line numbers of the print data in the secondary scanning direction, head IDs indicating numbers of the heads, and nozzle IDs indicating nozzle row numbers in a direction of arrangement of the nozzles on the print head, and showing, with the sheet IDs, the line IDs, the head IDs, and the nozzle IDs, operation at a time of printing the print data by the print head;

a data guarantee information adding unit for adding, to the print data and the sequence information, data guarantee information generated from the print data and the sequence information for error detection in print information;

a readout unit for reading the print information including the print data, the sequence information, and the data guarantee information, and generated for each of the nozzles arranged on the plurality of heads; and an information inspecting unit for inspecting propriety of the print information with the data guarantee information added thereto, which inspection is carried out before the print information is transmitted to the printing station, by inspecting propriety of the data guarantee information based on the data guarantee information and the sequence information read by the readout unit, and inspecting propriety of the sequence information by comparing the sequence information with printing sequence information as the printing progresses.

2. The printing apparatus according to claim 1, wherein the data guarantee information adding unit is arranged to generate the data guarantee information consisting of error-correcting codes, by encoding the printing data and the sequence information.

3. The printing apparatus according to claim 1, wherein the head controller further comprises a buffer unit disposed between the data guarantee information adding unit and the readout unit.

4. The printing apparatus according to claim 1, wherein the head controller further comprises a buffer unit disposed between the data guarantee information adding unit and the readout unit.

5. The printing apparatus according to claim 2, wherein the head controller further comprises a buffer unit disposed between the data guarantee information adding unit and the readout unit.

6. The printing apparatus according to claim 1, wherein the head controller further comprises a buffer unit disposed between the data guarantee information adding unit and the readout unit.

7. The printing apparatus according to claim 3, wherein the data guarantee information adding unit is arranged to use a bank control mode which sets up a virtual arrangement of primary scanning and secondary scanning in two dimensions, and writes the print information to the buffer unit.

8. The printing apparatus according to claim 4, wherein the data guarantee information adding unit is arranged to use a bank control mode which sets up a virtual arrangement of primary scanning and secondary scanning in two dimensions, and writes the print information to the buffer unit.

9. The printing apparatus according to claim 5, wherein the data guarantee information adding unit is arranged to use a bank control mode which sets up a virtual arrangement of primary scanning and secondary scanning in two dimensions, and writes the print information to the buffer unit.

10. The printing apparatus according to claim 6, wherein the data guarantee information adding unit is arranged to use a bank control mode which sets up a virtual arrangement of primary scanning and secondary scanning in two dimensions, and writes the print information to the buffer unit.

11. The printing apparatus according to claim 3, wherein the data guarantee information adding unit is arranged to use a roll control mode which takes into consideration a delay between a plurality of nozzle rows arranged in a secondary scanning direction on the print head, and writes the print information to the buffer unit while shifting write-in positions.

12. The printing apparatus according to claim 4, wherein the data guarantee information adding unit is arranged to use a roll control mode which takes into consideration a delay between a plurality of nozzle rows arranged in a secondary scanning direction on the print head, and writes the print information to the buffer unit while shifting write-in positions.

13. The printing apparatus according to claim 5, wherein the data guarantee information adding unit is arranged to use a roll control mode which takes into consideration a delay between a plurality of nozzle rows arranged in a secondary scanning direction on the print head, and writes the print information to the buffer unit while shifting write-in positions.

14. The printing apparatus according to claim 6, wherein the data guarantee information adding unit is arranged to use a roll control mode which takes into consideration a delay between a plurality of nozzle rows arranged in a secondary scanning direction on the print head, and writes the print information to the buffer unit while shifting write-in positions.

15. A printing method for performing printing under control of a head controller which receives image data from a print image generator, and which is interposed between the print image generator and a printing station with a print head having a plurality of inkjet type heads juxtaposed in a primary scanning direction perpendicular to a secondary scanning direction corresponding to a direction of movement relative to printing paper for printing, each head having a plurality of nozzles arranged in the primary scanning direction, the method comprising the steps of:

shaping the image data into print data corresponding to each of the nozzles arranged on the plurality of heads juxtaposed on the print head;

generating sequence information, showing operation of the print head at a time of printing based on the print data, the sequence information including sheet IDs indicating pages of the printing paper, line IDs indicating line numbers of the print data in the secondary scanning direction, head IDs indicating numbers of the heads, nozzle IDs indicating nozzle row numbers in a direction of arrangement of the nozzles on the print head, and showing, with the sheet IDs, the line IDs, the head IDs and the nozzle IDs, operation at a time of printing the print data by the print head;

adding, to the print data and the sequence information, data guarantee information generated from the print data and the sequence information for error detection in print information;

reading the print information including the print data, the sequence information, and the data guarantee information, and generated for each of the nozzles arranged on the plurality of heads;

inspecting propriety of the print information with the data guarantee information added thereto, which inspection is carried out before the print information is transmitted to the printing station, by inspecting propriety of the data guarantee information based on the data guarantee information and the sequence information, and inspecting propriety of the sequence information by comparing the sequence information with printing sequence information as the printing information as the printing progresses; and executing printing based on the print information when results of the inspection of the data guarantee information and the inspection of the sequence information are both proper.

16. The printing method according to claim 15, wherein the step of adding the data guarantee information generates the data guarantee information consisting of error-correcting codes by encoding the printing data and the sequence information.

17. The printing apparatus according to claim 1, wherein the head controller is arranged to execute printing based on the print information when results of inspection of the data guarantee information and inspection of the sequence information are both proper.

* * * * *